United States Patent
Quinn et al.

(10) Patent No.: US 9,649,530 B2
(45) Date of Patent: May 16, 2017

(54) FULL-BODY EXERCISE SYSTEM INCLUDING A PLURALITY OF INDEPENDENTLY OPERABLE APPENDICULAR MEMBERS

(71) Applicants: Robert Quinn, Itasca, IL (US); Ivan Kiselev, Itasca, IL (US)

(72) Inventors: Robert Quinn, Itasca, IL (US); Ivan Kiselev, Itasca, IL (US)

( * ) Notice: Subject to any disclaimer, the term of this patent is extended or adjusted under 35 U.S.C. 154(b) by 51 days.

(21) Appl. No.: 14/585,117

(22) Filed: Dec. 29, 2014

(65) Prior Publication Data
US 2016/0184628 A1    Jun. 30, 2016

(51) Int. Cl.
*A63B 24/00* (2006.01)
*A63B 23/035* (2006.01)
(Continued)

(52) U.S. Cl.
CPC .. *A63B 23/03575* (2013.01); *A63B 21/00845* (2015.10); *A63B 21/4034* (2015.10);
(Continued)

(58) Field of Classification Search
CPC . A63B 24/00; A63B 24/0062; A63B 21/0056; A63B 21/012; A63B 21/0051; A63B 22/001; A63B 24/0087; A63B 21/0058; A63B 21/0083; A63B 21/0087; A63B 21/4034; A63B 21/4035; A63B 21/00845; A63B 21/4045; A63B 21/4047; A63B 23/03575; A63B 23/03541; A63B 23/1209; A63B 2220/20; A63B 2220/30; A63B 2220/40; A63B 2220/51;
(Continued)

(56) References Cited

U.S. PATENT DOCUMENTS 5,816,372 A    10/1998  Carlson et al.
RE36,031 E  *  1/1999  Piaget ............... A63B 22/001
                                                434/255
(Continued)

OTHER PUBLICATIONS

Ahmadkhanlou, Farzad "Design, Modeling and Control of Magnetorheological Fluid-Based Force Feedback Dampers for Telerobotic Systems" (2008).
(Continued)

*Primary Examiner* — Glenn Richman
(74) *Attorney, Agent, or Firm* — The Polit IP Law Group, Ltd.

(57) ABSTRACT

A full-body exercise system is described. The full-body exercise system includes a frame, and plurality of appendicular members extending from the frame. Each of the plurality of appendicular members is configured for engagement with a respective limb of a user. Further, each of the plurality of appendicular members is movable in a degree of freedom independent of other ones of the plurality of appendicular members. The full-body exercise system also includes a resistive system configured to provide a resistive force on each of the plurality of appendicular members with respect to movement in its respective degree of freedom. The resistive force provided by the resistive system on each of the plurality of appendicular members is adjustable in a generally continuous manner independent of resistive forces on other ones of the plurality of appendicular members.

20 Claims, 14 Drawing Sheets

(51) Int. Cl.

| | |
|---|---|
| *G05G 9/047* | (2006.01) |
| *A63B 21/00* | (2006.01) |
| *A63B 21/005* | (2006.01) |
| *A63B 21/008* | (2006.01) |
| *A63B 23/12* | (2006.01) |
| *A63B 23/04* | (2006.01) |
| *A63F 13/211* | (2014.01) |
| *A63F 13/67* | (2014.01) |

(52) U.S. Cl.
CPC ...... *A63B 21/4035* (2015.10); *A63B 21/4045* (2015.10); *A63B 21/4047* (2015.10); *A63B 23/03541* (2013.01); *A63B 24/0087* (2013.01); *G05G 9/047* (2013.01); *A63B 21/0058* (2013.01); *A63B 21/0083* (2013.01); *A63B 21/0087* (2013.01); *A63B 23/1209* (2013.01); *A63B 2023/0447* (2013.01); *A63B 2024/0093* (2013.01); *A63B 2024/0096* (2013.01); *A63B 2208/0228* (2013.01); *A63B 2220/20* (2013.01); *A63B 2220/30* (2013.01); *A63B 2220/40* (2013.01); *A63B 2220/51* (2013.01); *A63B 2220/56* (2013.01); *A63B 2220/805* (2013.01); *A63B 2225/20* (2013.01); *A63B 2225/50* (2013.01); *A63F 13/211* (2014.09); *A63F 13/67* (2014.09)

(58) Field of Classification Search
CPC .......... A63B 2220/56; A63B 2220/805; A63B 2225/50; A63B 2225/20; A63B 2208/0228; A63B 21/0615; A63B 21/02; A63B 22/0002
See application file for complete search history.

(56) References Cited

U.S. PATENT DOCUMENTS

| | | | |
|---|---|---|---|
| 6,283,859 B1 | 9/2001 | Carlson et al. | |
| 6,450,922 B1 | 9/2002 | Henderson et al. | |
| 6,923,723 B2 | 8/2005 | Goden et al. | |
| 7,113,166 B1 | 9/2006 | Rosenberg et al. | |
| 7,276,018 B2 * | 10/2007 | Studdard | A63B 21/02 482/121 |
| 7,427,257 B1 * | 9/2008 | Chernet | A63B 21/0615 482/142 |
| 7,870,809 B2 | 1/2011 | Rice | |
| 8,007,412 B2 * | 8/2011 | Lofgren | A63B 22/0002 482/62 |
| 8,292,789 B2 * | 10/2012 | Maresh | A63B 21/0051 482/52 |
| 8,308,558 B2 | 11/2012 | Thorner | |
| 8,333,681 B2 * | 12/2012 | Schmidt | A63B 21/012 482/4 |
| 8,932,183 B2 * | 1/2015 | Ishii | A63B 21/0056 482/1 |
| 2006/0009891 A1 | 1/2006 | Pawlak et al. | |
| 2012/0109025 A1 | 5/2012 | Weinberg et al. | |
| 2013/0229272 A1 | 9/2013 | Elliott | |

OTHER PUBLICATIONS

U.S. Appl. No. 14/580,72, filed Dec. 29, 2014, "Networked Gaming System Having Multiple Full-Body Exercise Controllers".

U.S. Appl. No. 14/585,103, filed Dec. 29, 2014, "Game System Having Full-Body Exercise Apparatus Controller With Independently Operable Appendicular Members".

* cited by examiner

US 9,649,530 B2

FULL-BODY EXERCISE SYSTEM INCLUDING A PLURALITY OF INDEPENDENTLY OPERABLE APPENDICULAR MEMBERS

BACKGROUND

There are varieties of exercise devices configured to provide substantial physical workouts to a user to maintain and/or increase the user's fitness level. Stepping machines, treadmills, and many cycling machines are principally configured to exercise the lower portion of the body. Other machines, such as elliptical machines, and some rowing machines, provide a full-body workout in that they are configured to exercise the lower portion of the body by applying resistance to, or requiring movement of, one or both the legs of the user, and to exercise the upper portion of the body by applying resistance to, or requiring movement of one or both arms of the user.

Current full-body workout machines are designed to require direct coordinated motion between limbs during exercise. For example, elliptical machines are designed so that the motion of each limb is directly dependent on the motion of all other limbs of the user. This dependency is necessary to achieve the desired elliptical motion between the legs and arms of the user. No provision is made for the motion of one limb independent of the movement of all other limbs.

Further, the existing full-body workout machines do not have truly adjustable resistance features. Again, with respect to elliptical machine, the resistance experienced by one leg of the user is the same as the resistance experienced by the other leg of the user. Likewise, the resistance experienced by one arm of the user is the same as the resistance experienced by the other arm of the user. No provision is made for the application of a resistive force to one limb independent of the resistive force experienced by all other limbs.

Exercise on existing full-body exercise apparatus tends to be very repetitive. This repetition can distort perception of the total workout time, making it seem longer than it truly is. To reduce this distortion, gyms often play music and show television near the exercise apparatus. However, these techniques often are not completely successful since they only distract the user from the workout as opposed to making the direct engagement between the user and the exercise machine more enjoyable.

SUMMARY

A full-body exercise system is described. The full-body exercise system includes a frame, and plurality of appendicular members extending from the frame. Each of the plurality of appendicular members is configured for engagement with a respective limb of a user. Further, each of the plurality of appendicular members is movable in a degree of freedom independent of other ones of the plurality of appendicular members. The full-body exercise system also includes a resistive system configured to provide a resistive force on each of the plurality of appendicular members with respect to movement in its respective degree of freedom. The resistive force provided by the resistive system on each of the plurality of appendicular members is adjustable in a generally continuous manner independent of resistive forces on other ones of the plurality of appendicular members.

In one example, the resistive system comprises one or more smart fluid-based actuators respectively associated with one or more of the plurality of appendicular members. The one or more smart fluid-based actuators may comprise a smart fluid selected from an electro-rheological fluid or a magneto-rheological fluid.

In a further example, the full-body exercise system includes a control system configured to provide control signals to adjust the resistive force provided by the resistive system on each of the plurality of appendicular members. The control system may include a user interface to select a workout program, which is used to adjust the resistive force on each of the plurality of appendicular members.

Other features of the full-body exercise system will be apparent from the following drawings and corresponding description.

DETAILED DESCRIPTION

Figure 1:
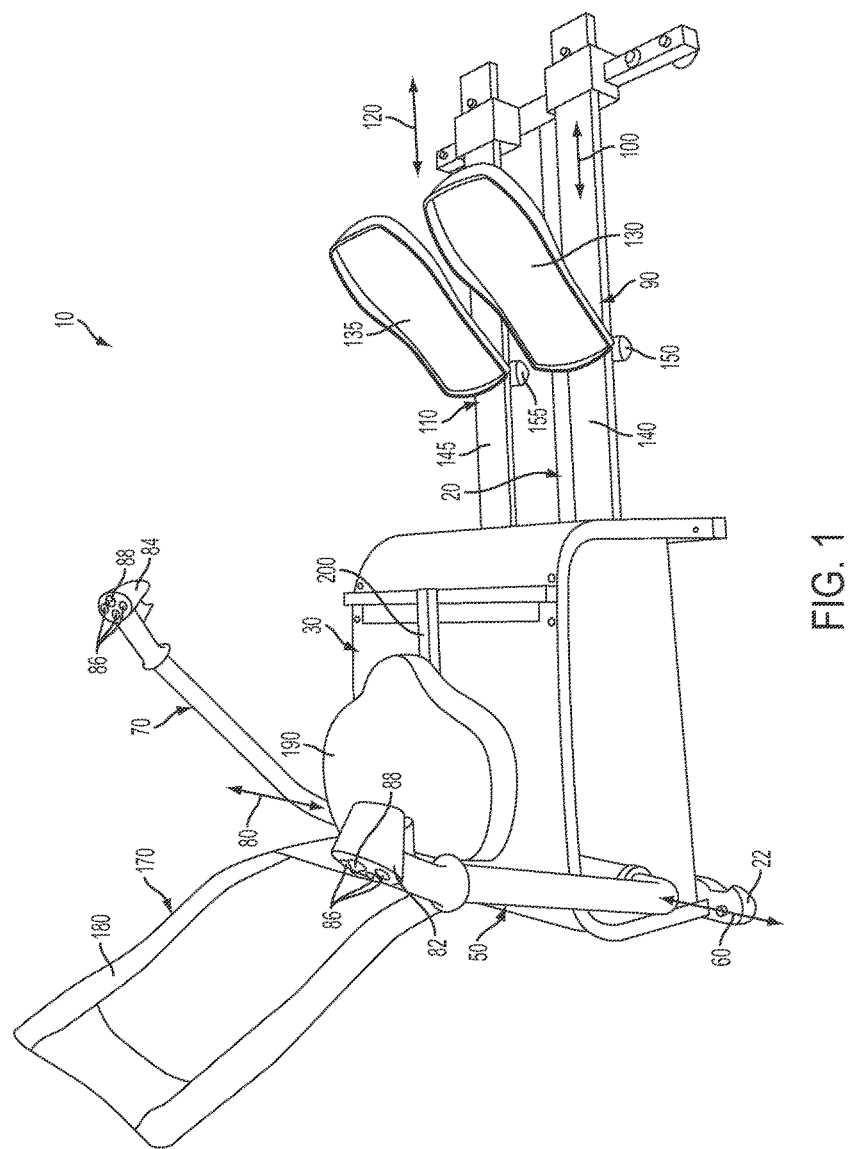
FIG. 1 is a perspective view of one example of a full-body exercise apparatus.

FIG. 1 is a perspective view of one example of the exterior portions of a full-body exercise apparatus 10. As shown, the full-body exercise apparatus 10 includes a frame 20, which is configured to support or be integrated with, various other elements of the full-body exercise apparatus 10. The frame 20 may be in the form of a single integral structure, separate structures that, for example, are in a fixed relationship with one another, or any other structure used to support or integrate with various components of the full-body exercise apparatus 10. The full-body exercise apparatus 10 may also include one or more transport members to facilitate moving it to and from various locations. Here, the transport members are in the form of a plurality of wheels 22 (only one shown in FIG. 1).

In FIG. 1, the frame 20 includes a housing 30, which may partially or completely enclose resistive components of the full-body exercise apparatus 10. Various examples of the resistive components are set forth below.

A plurality of appendicular members extends from the frame and are configured for engagement with a respective limb of the user. Each of the appendicular members is movable in a degree of freedom independent of other ones of the plurality of appendicular members. Here, the plurality of appendicular members include a first appendicular member 50 that is configured for rotation by a first arm of a user about a first pivot axis 60. A second appendicular member 70 is configured for rotation by a second arm of a user about a second pivot axis 80. The first pivot axis 60 and second pivot axis 80 may be generally collinear. In this example, the first appendicular member 50 and second appendicular member 70 are disposed on opposite sides of the housing 30. One or both of the first appendicular member 50 and second appendicular member 70 may terminate at respective handgrips 82 and 84 to engage the hands of the user. As shown, one or both of the handgrips 82 and 84 may include a plurality of buttons 86 and/or mouse-like devices 88 that may be used to implement various functions associated with the full-body exercise apparatus 10.

The full-body exercise apparatus 10 may also include appendicular members used to provide a lower body workout. In FIG. 1, a third appendicular member 90 extends from the frame 20 and is configured to engage a first leg of the user. In this example, the third appendicular member 90 is movable along a first generally linear axis 100. Further, a fourth appendicular member 110 extends from the frame 20 and is configured to engage a second leg of the user. The fourth appendicular member 110 of this example is movable along a second generally linear axis 120. The first generally linear axis 100 and second generally linear axis 120 may be parallel with one another, and disposed horizontally or at an angle with respect to the horizon. The housing 30 may partially or completely enclose resistive elements associated with the third appendicular member 90 and the fourth appendicular member 110.

The third appendicular member 90 and fourth appendicular member 110 are both constructed in a similar manner. To this end, the third appendicular member 90 includes a pedal 130 connected to a sliding member 140 at joint 150. The fourth appendicular member 110 includes a pedal 135 connected to a sliding member 145 by a joint 155. With respect to the fourth appendicular member 110, it includes a pedal 130 connected to a sliding member 140 by a joint 150. The joints 150 and 155 may be fixed or configured for at least partial rotation about respective axes to allow flexion of the ankle of the user. The sliding member 140 is disposed on top of a rail (not shown in FIG. 1) so that the third appendicular member 90 is slidable along the rail in the direction of axis 100. Likewise, the sliding member 145 is disposed on top of a respective rail (not shown in FIG. 1) so that the fourth appendicular member 110 is slidable along the rail in the direction of axis 120.

The user is supported on the full-body exercise apparatus 10 by a seat 170. The seat 170 includes a back portion 180 and a saddle portion 190. The angles at which one or both of the back portion 180 and saddle portion 190 engage the user may be adjustable. Further, the horizontal position of the seat 170 may be adjusted along rail 200 as desired to place the user in a comfortable exercise position.

FIGS. 2-9 illustrate the plurality appendicular members in various positions. As shown in these figures, each appendicular member is movable independent of movement of other ones of the plurality of the appendicular members.

Figure 2:
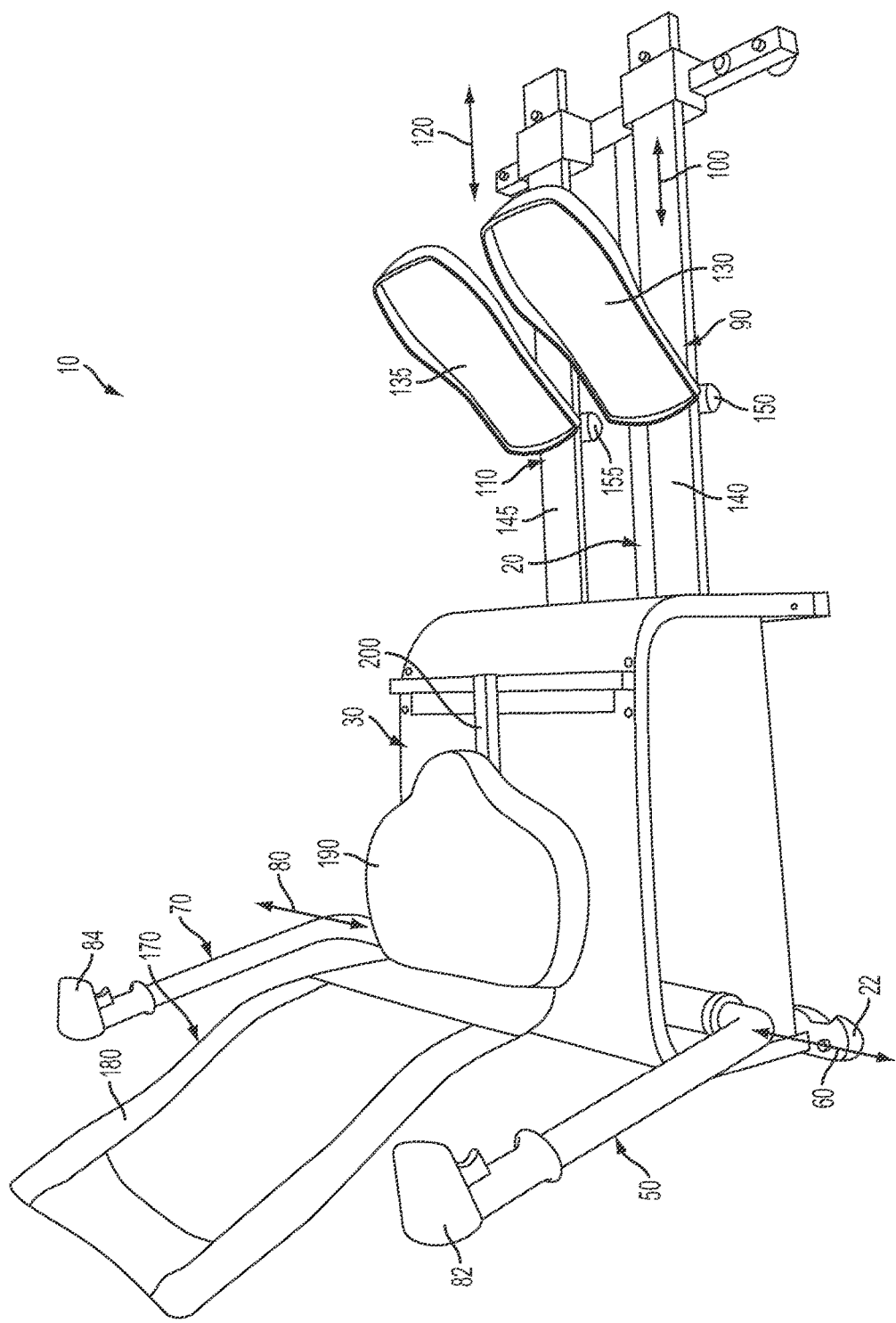
FIG. 2 illustrates the position of the appendicular members associated with the upper body of a user when they are each rotated to a retracted position.
Figure 3:
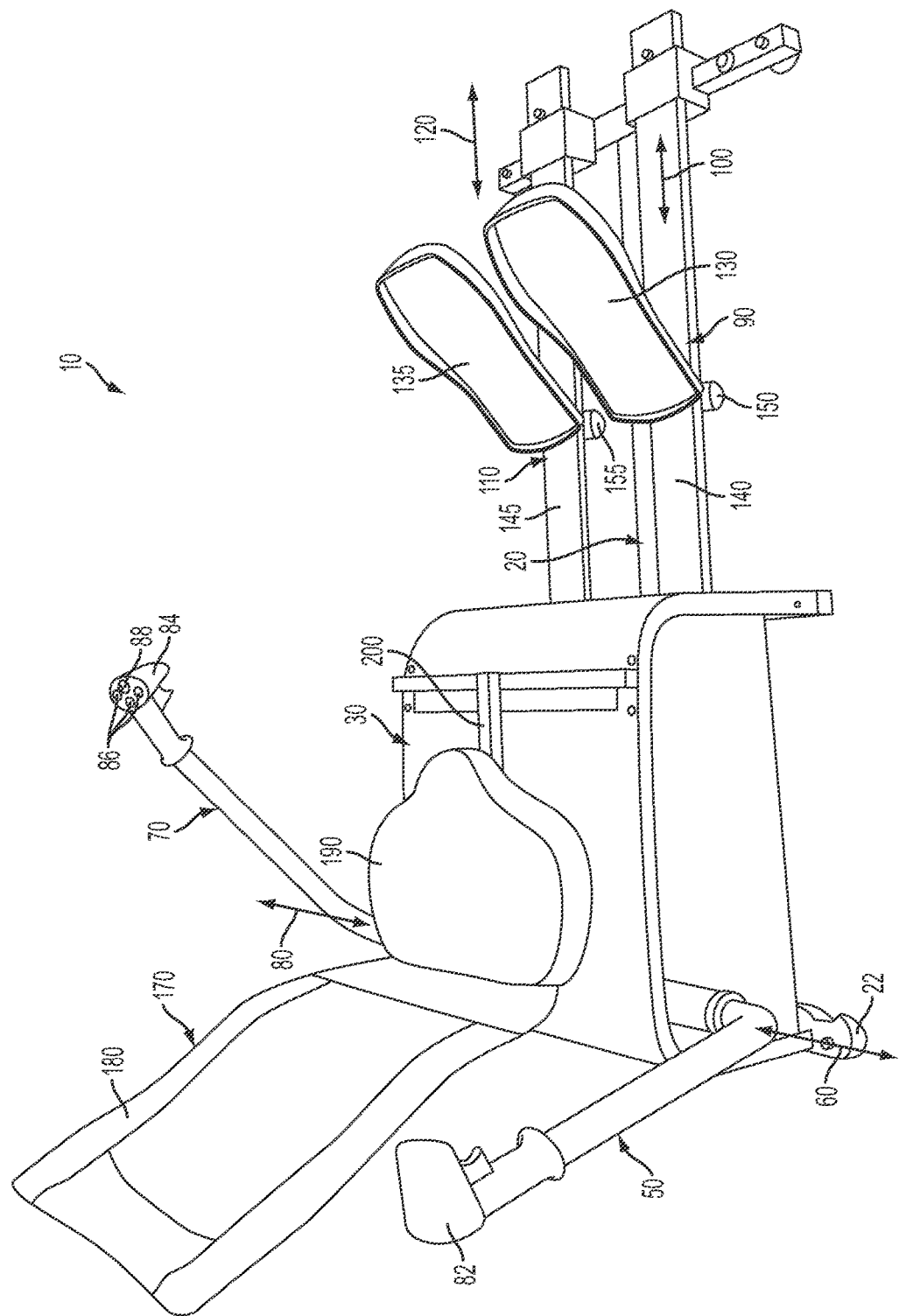
FIG. 3 illustrates the position of the appendicular members associated with the upper body of a user when the right arm is rotated to a retracted position and the left arm is rotated to an extended position.
Figure 4:
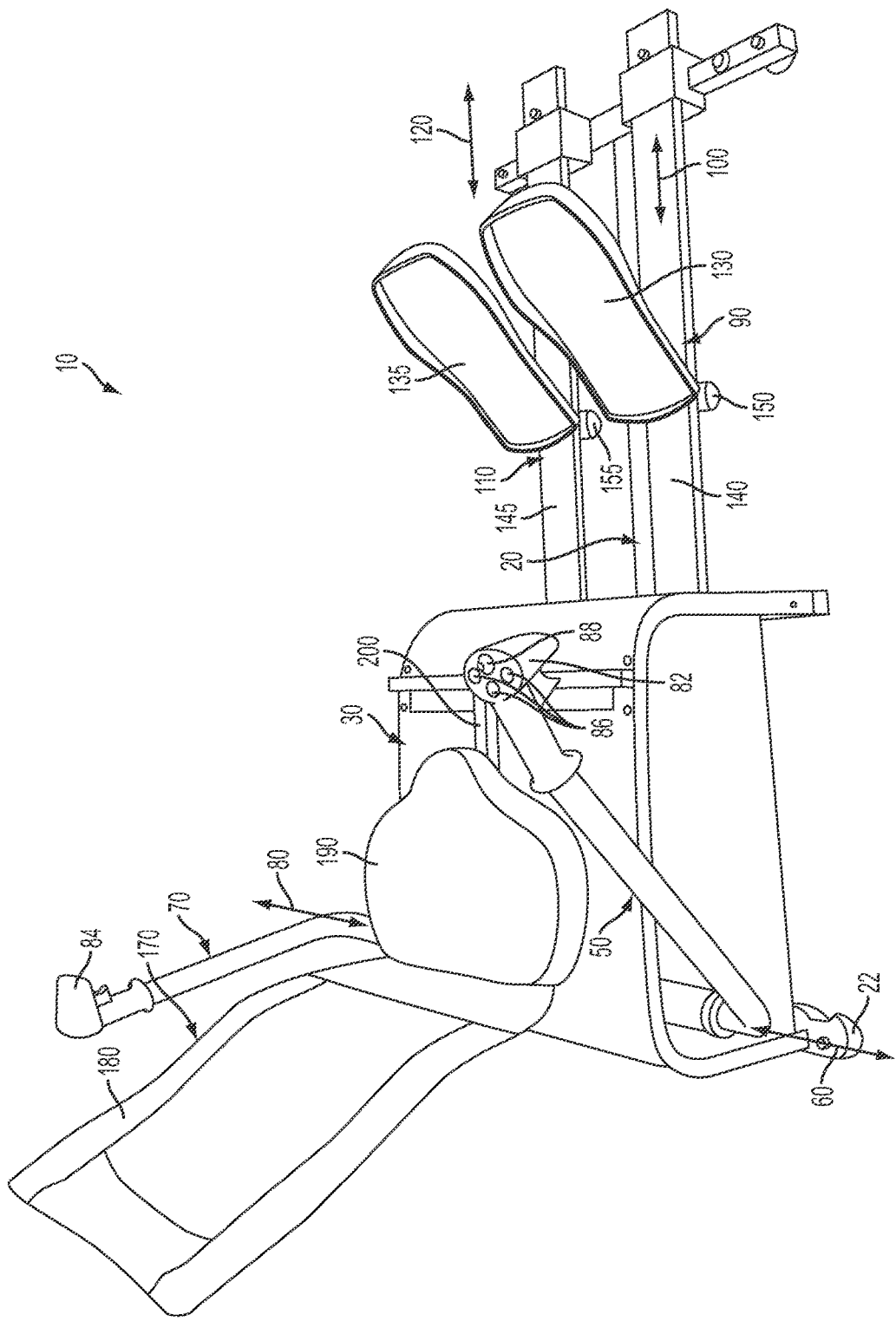
FIG. 4 illustrates the position of the appendicular members associated with the upper body of a user when the left arm is rotated to a retracted position and the right arm is rotated to an extended position.
Figure 5:
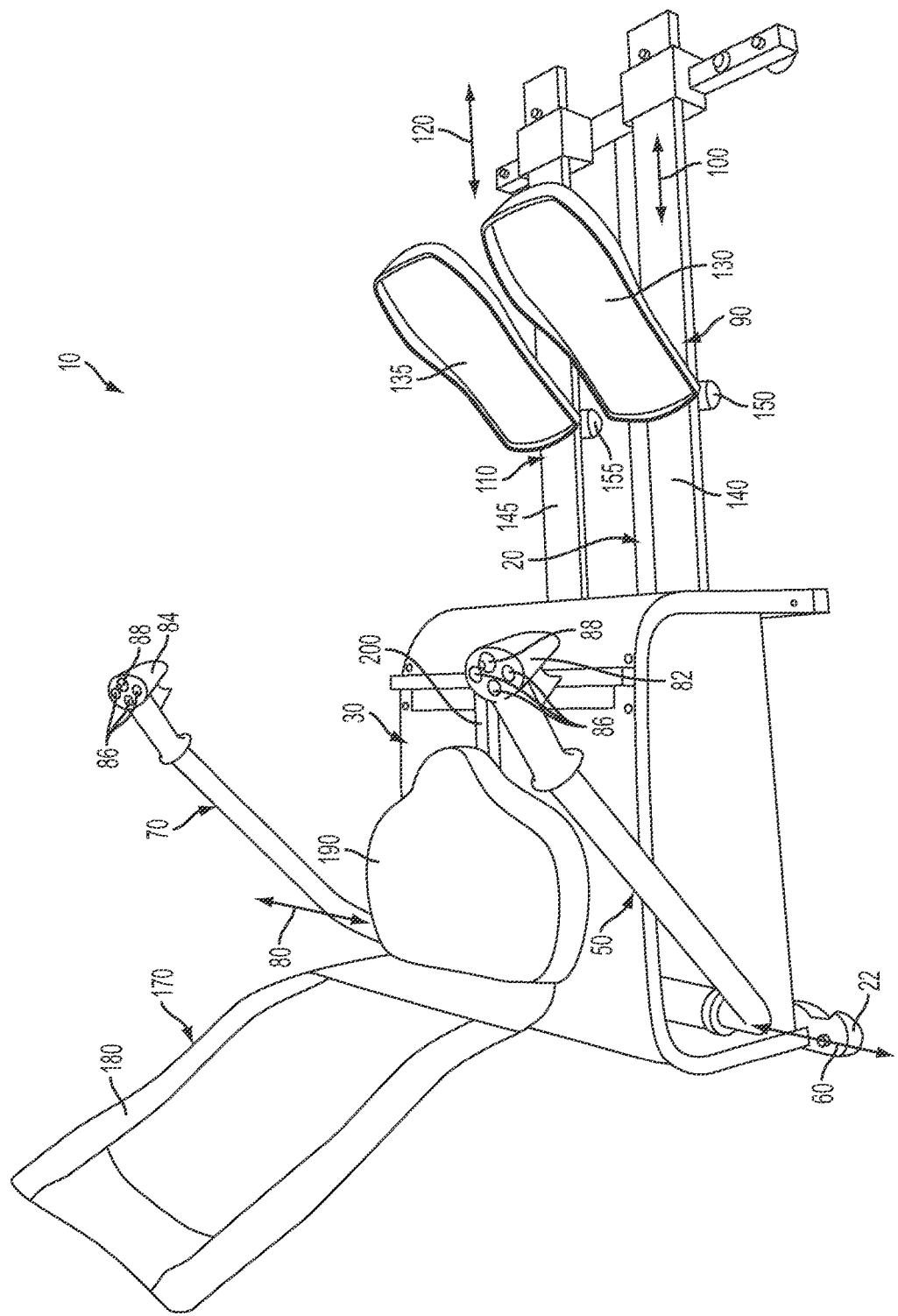
FIG. 5 illustrates the position of the appendicular members associated with the upper body of a user when both arms of the user are rotated to an extended position.

With respect to the appendicular members 50 and 70 associated with the upper body, FIG. 2 illustrates both the appendicular members 50 and 70 in a refracted position. FIG. 3 illustrates the appendicular member 50 for the right arm of the user in a retracted position and the second appendicular member 70 for the left arm rotated to an extended position. FIG. 4 illustrates the second appendicular member 70 for the left arm in a retracted position and the first appendicular member 50 for the right arm rotated to an extended position. FIG. 5 illustrates the first and second appendicular members 50 and 70 both rotated to extended positions.

Figure 6:
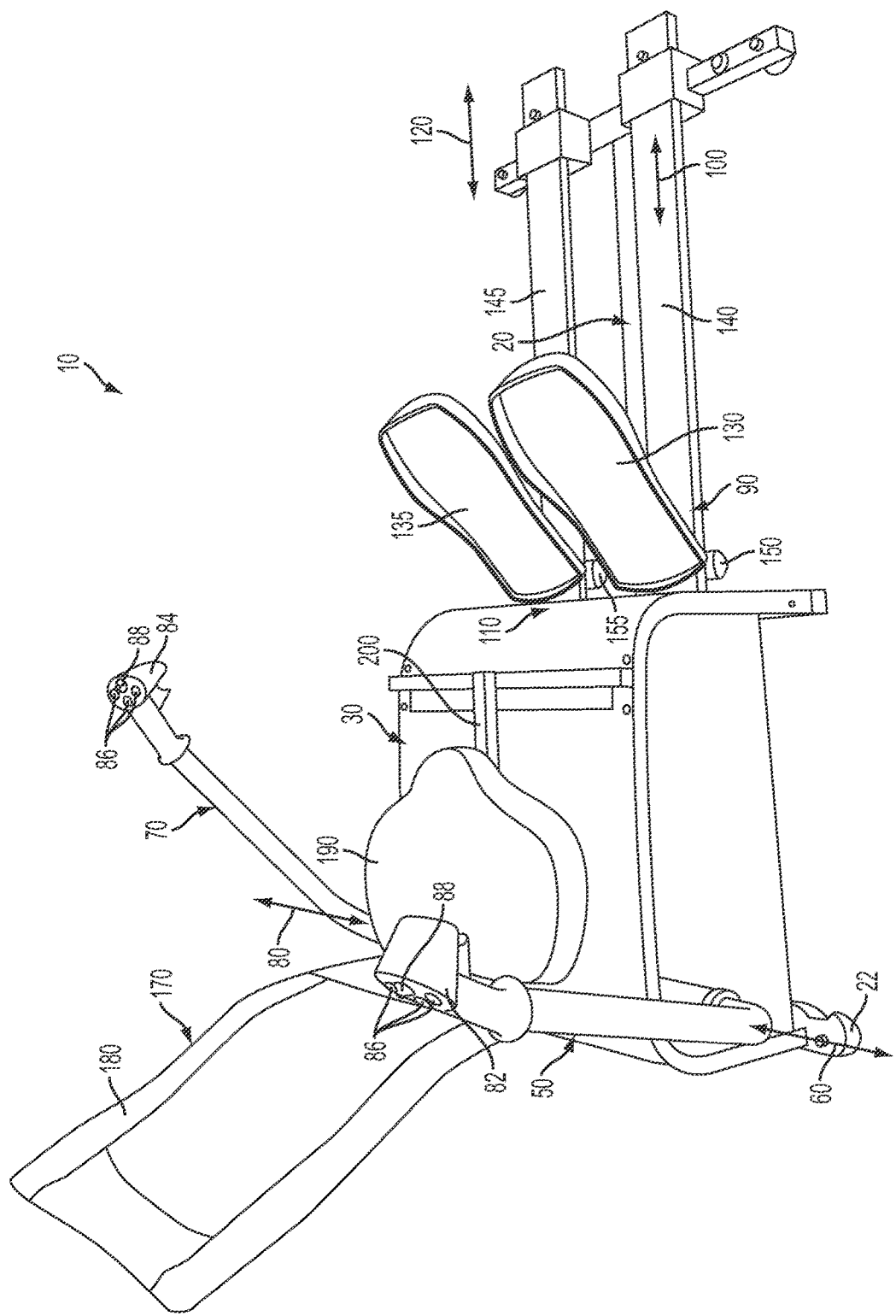
FIG. 6 illustrates the position of the appendicular members associated with the lower body of a user in a retracted position.
Figure 7:
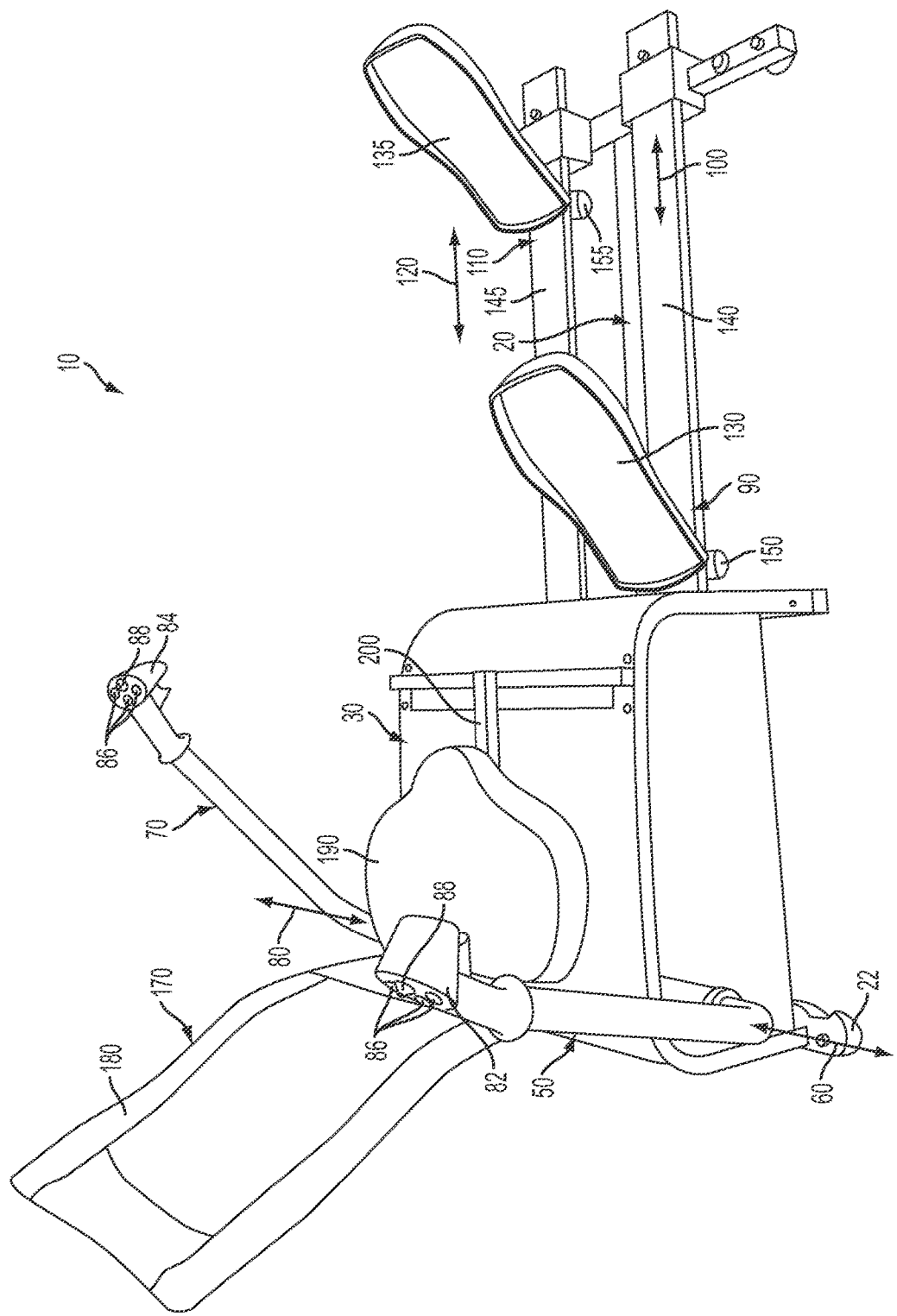
FIG. 7 illustrates the position of the appendicular members associated with the lower body of a user when the right leg is in a retracted position and the left leg is in an extended position.
Figure 8:
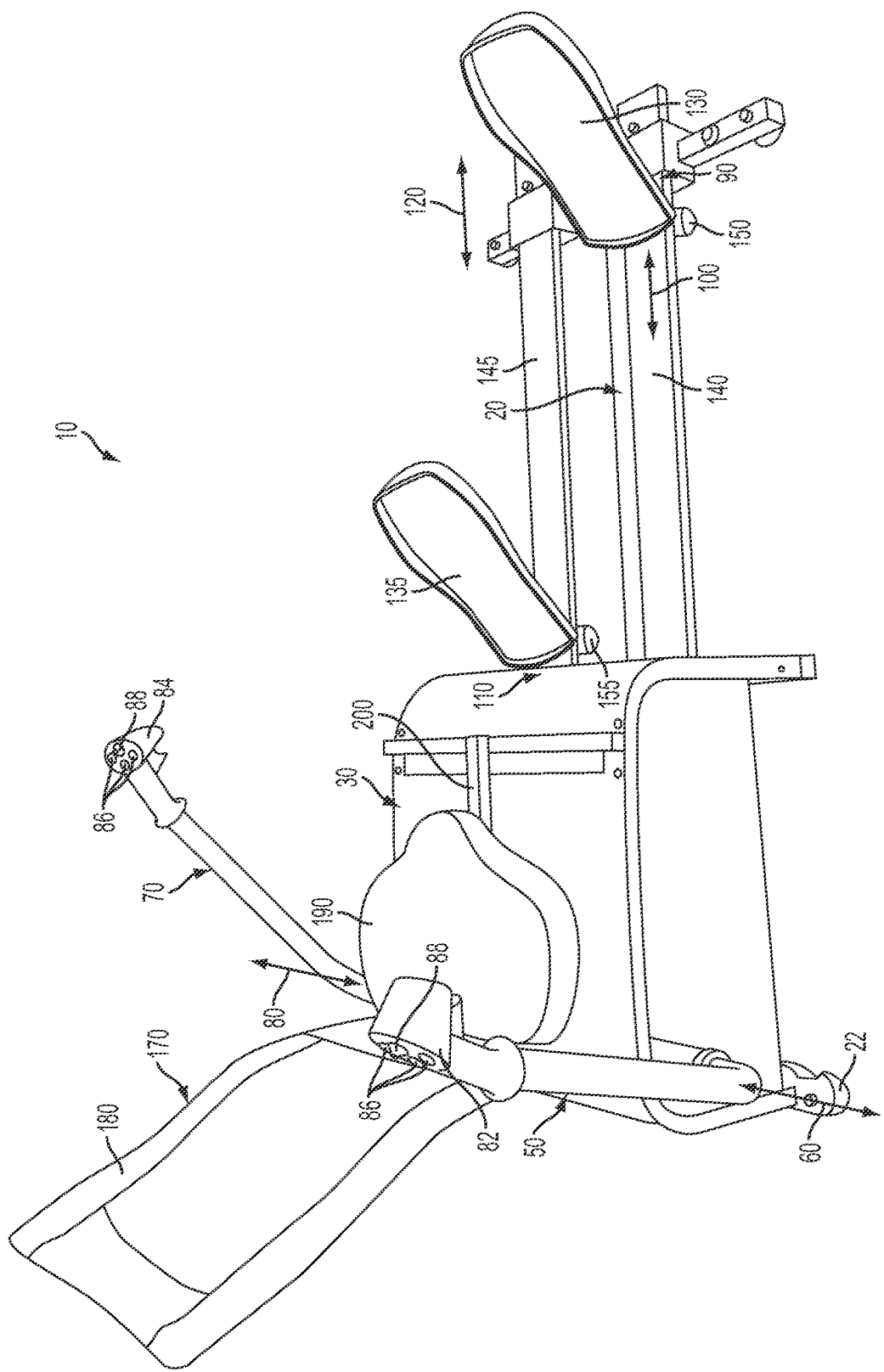
FIG. 8 illustrates the position of the appendicular members associated with the lower body of a user when the left leg is in a retracted position and the right leg is in an extended position.
Figure 9:
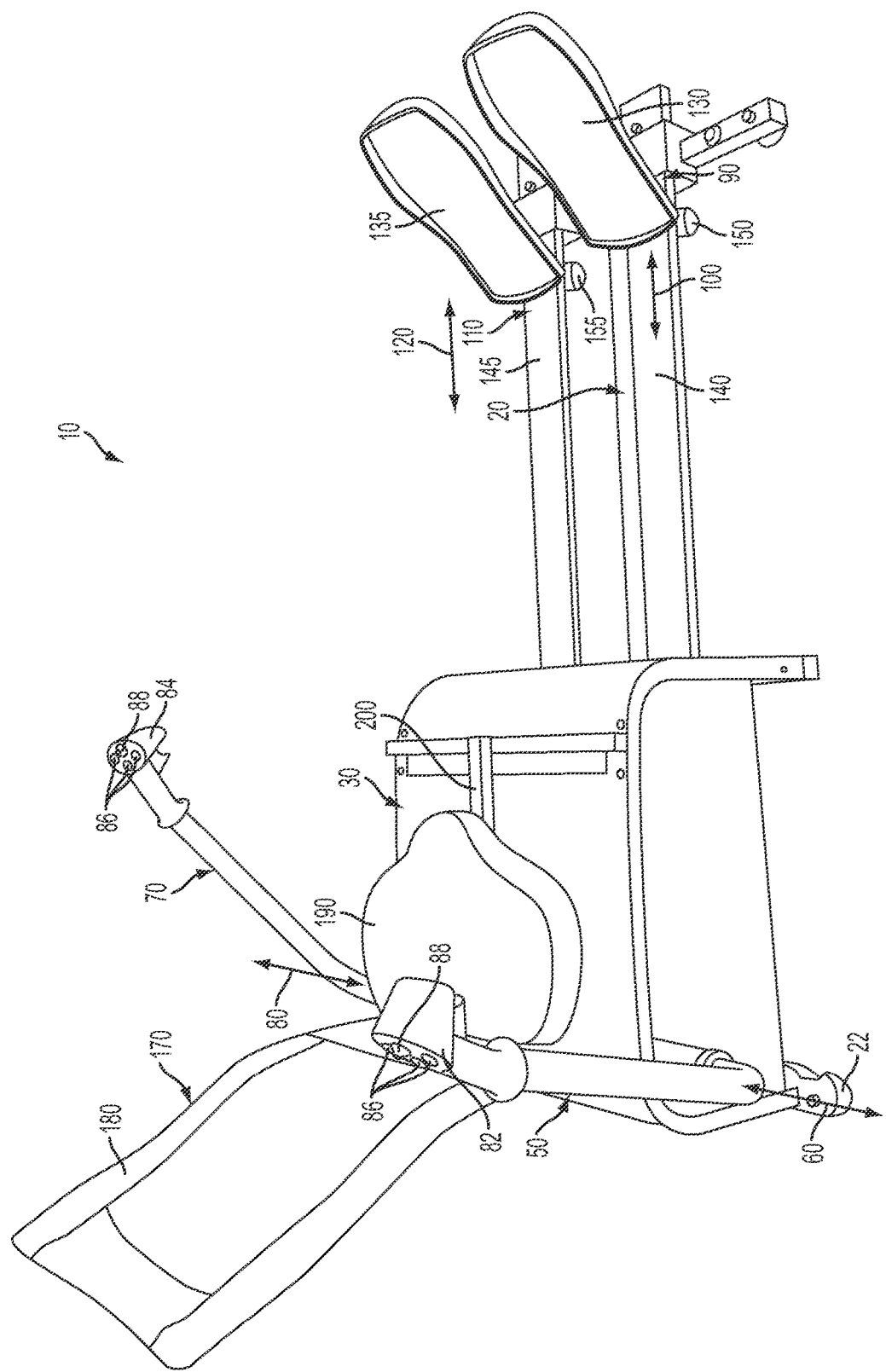
FIG. 9 illustrates the position of the appendicular members associated with the lower body of a user where both legs are in an extended position.

With respect to the third and fourth appendicular members 90 and 110 associated with the lower body, FIG. 6 illustrates the third and fourth appendicular members 90 and 110 in a retracted position. FIG. 7 illustrates the fourth appendicular member 110 in a retracted position and the third appendicular member 90 in an extended position. FIG. 8 illustrates the third appendicular member 90 in a retracted position and the fourth appendicular member 110 in an extended position. FIG. 9 illustrates both the third and fourth appendicular members 90 and 110 in an extended position.

Figure 10:
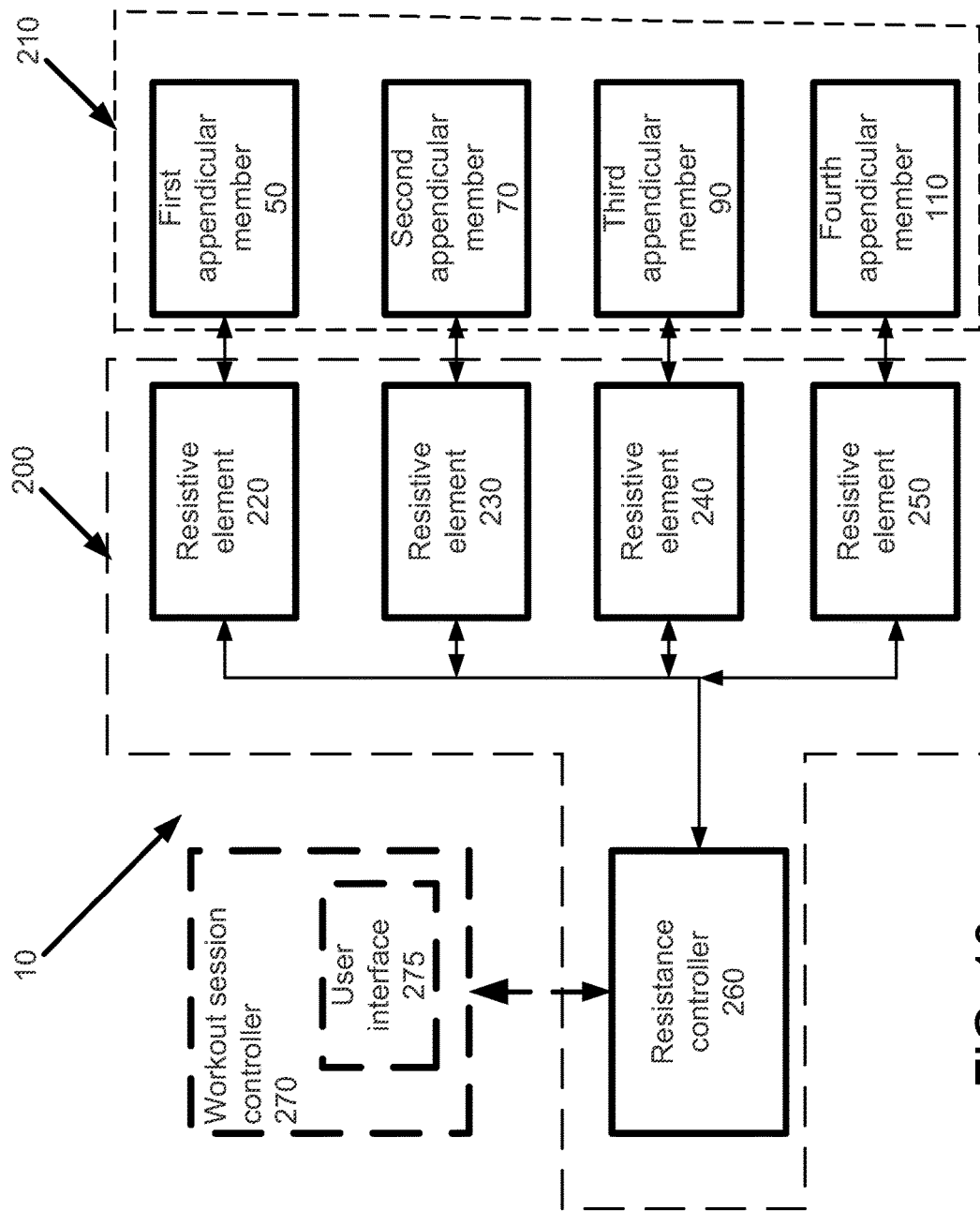
FIG. 10 is a schematic block diagram of a system that may be used to independently control the resistive force experienced by a user on each of the plurality of appendicular members.

FIG. 10 is a schematic block diagram of the full-body exercise apparatus 10 showing a resistive system 200 that may be used to independently control the resistive force provided on each of the plurality of appendicular members in its respective degree of freedom. The resistive system 200 may adjust the resistive forces in a generally continuous manner. In this example, a set of appendicular members 210 includes first appendicular member 50, second appendicular member 70, third appendicular member 90, and fourth appendicular member 110. Resistive element 220 is connected so as to apply a resistive force to the first appendicular member 50. Resistive element 230 is connected so as to apply a resistive force to the second appendicular member 70. Resistive element 240 is connected so as to apply a resistive force to the third appendicular member 90. Resistive element 250 is connected so as to apply a resistive force to the fourth appendicular member 110. One or more of the resistive elements 220, 230, 240, and 250 may be consolidated with one another so long as they are connected to apply independently controllable resistive forces to the appendicular members 50, 70, 90, and 110.

The resistive elements 220, 230, 240, and 250 may include any one of a variety of variable resistance structures. For example, one or more of the resistive elements 220, 230, 240, and 250 may be in the form of hydraulic and/or pneumatic actuators. Additionally, or in the alternative, the resistive elements may include one or more smart fluid-based actuators that, for example, are respectively associated with one or more of the plurality of appendicular members 50, 70, 90, and 110. In one example, the smart fluid-based actuators may include a smart-fluid selected from an electro-rheological fluid or a magneto-rheological fluid. Such smart fluid-based actuators may be used for resistive elements 220 and 230 to control the resistive forces experienced by the upper body of the user at the first appendicular member 50 and second appendicular member 70. Likewise, such smart fluid-based actuators may be used for resistive elements 240 and 250 to control the resistive forces experienced by lower body of the user at the third appendicular member 90 and fourth appendicular member 110. In one example, as will be explained below, resistive elements 240 and 250 may share common elements but, nevertheless, independently control the resistive forces experienced by the lower body of the user.

A resistance controller 260 may provide control signals to the resistive elements 220, 230, 240, and 250. The resistance controller 260 may send individual control signals to each of the resistive elements to set the resistive force applied by the resistive elements to their respective appendicular members. The control signals may be in an analog and/or digital format. For example, the control signals may be provided in the form of a current. Adjustable currents are particularly well suited when the resistive element is in the form of a smart-fluid actuator and/or a regenerative motor. Differing electric current magnitudes may be used to control the resistive force provided on each of the plurality of appendicular members so that each appendicular member has a different resistive force. The control signals may also be in a digital format, in which case the digital data transmitted to each resistive element may be converted in-situ and one or more of the plurality of appendicular members to an analog signal.

Optionally, the full-body exercise apparatus 10 may include a workout session controller 270 that is in communication with the resistance controller 260. In turn, the workout session controller 270 may include a user interface 275 used to allow user entry of a pre-programmed or customized workout session. The resistance controller 260 directs the resistive elements 220, 230, 240, and 250 to apply their respective resistive forces in accordance with the pre-programmed or customized workout session selected by the user.

Positional information for the third and fourth appendicular members 90 and 110 may be derived from a number of different sensor types that may be disposed at one or more locations. For example, the positions of the sliding members 140 and 145 may be detected using one or more magnetic or optical sensors 455. Additionally, or in the alternative, the positions of the third appendicular member 90 and fourth appendicular member 110 may be sensed by placing respective rheostats 460 and 465 in positions to co-rotate with cross-rods 330 and 335.

Figure 11:
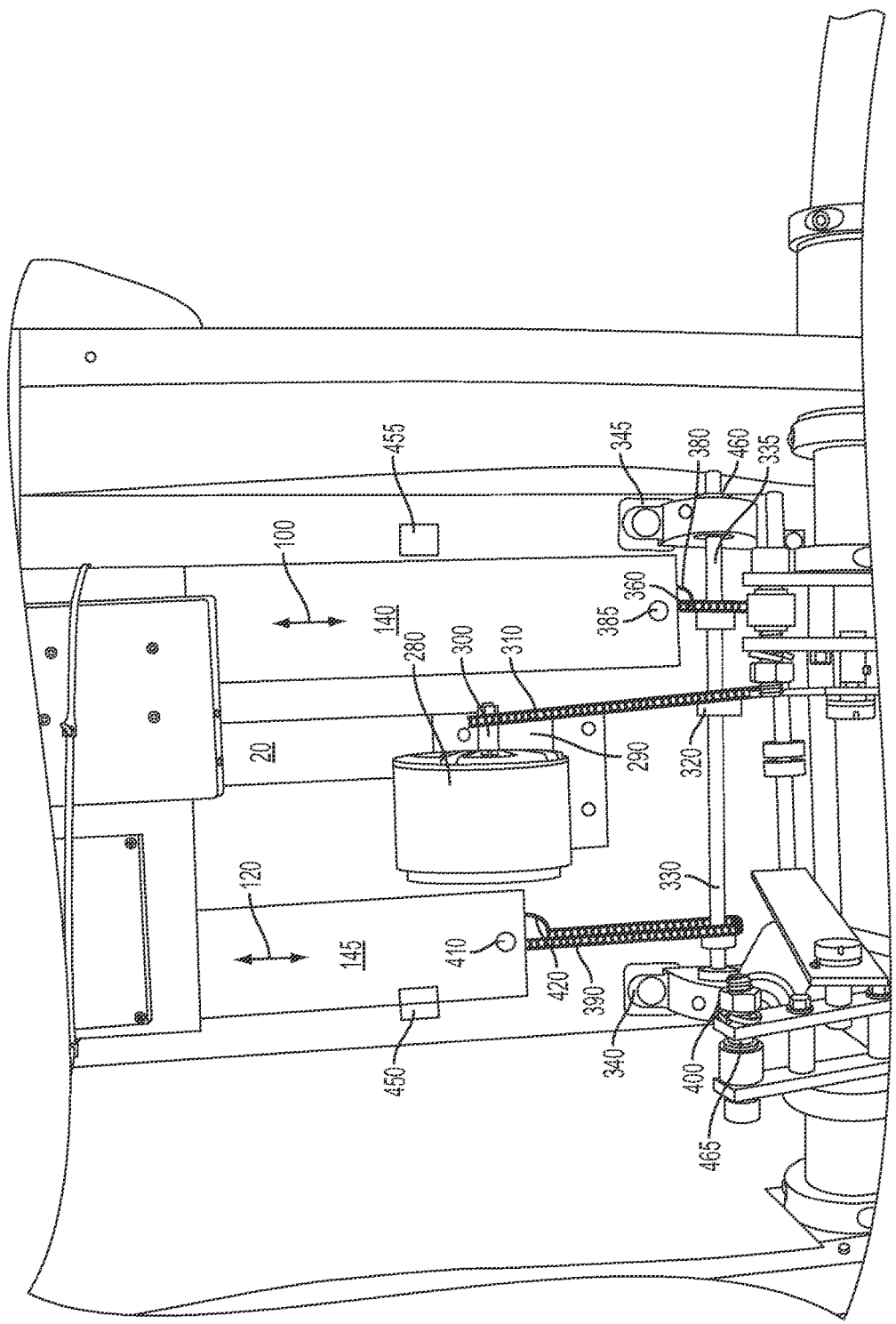
FIG. 11 shows one example of the resistance members and corresponding motion feedback associated with the third and fourth appendicular members.

FIG. 11 shows one manner in which the resistive elements 240 and 250 may be configured to allow independent movement of the third and fourth appendicular members 90 and 110 while sharing various components. Here, the resistive element is a regenerative motor 280 that is responsive to current signals provided by the resistance controller 260 to adjust its resistive torque. As shown, the regenerative motor 280 is secured to a base plate 290 of the frame 20. The shaft 300 of the regenerative motor 280 engages a transmission member 310, which, in turn, engages a single direction clutch 320 disposed on cross-rods 330 and 335. The cross-rods 330 and 335 collectively extend between a pair of anchor bearings 340 and 350 in a direction transverse to axes 100 and 120.

A transmission member 360 extends about gear mechanism 370 and engages the sliding member 140 at a first end 385 and a spring bias member at a second end 380. As such, the sliding member 140 is biased toward a rear position, corresponding to the position of the third and fourth appendicular members shown in FIG. 7 above.

A further transmission member 390 extends about gear mechanism 400 and engages the sliding member 145 at a first end 410 and a spring bias member at a second end 420. Again, the sliding member 145, like the sliding member 140, is biased toward a rear position. With this configuration, the amount of force needed to extend a given sliding member forward is dependent on the resistive force provided by the regenerative motor 280.

Each of the transmission members 360 and 390 are associated with motion of the corresponding appendicular members. In this example, drive chains are used for the transmission members 310, 360, and 390, although other types of transmission members, such as timing belts, may be used.

Figure 12:
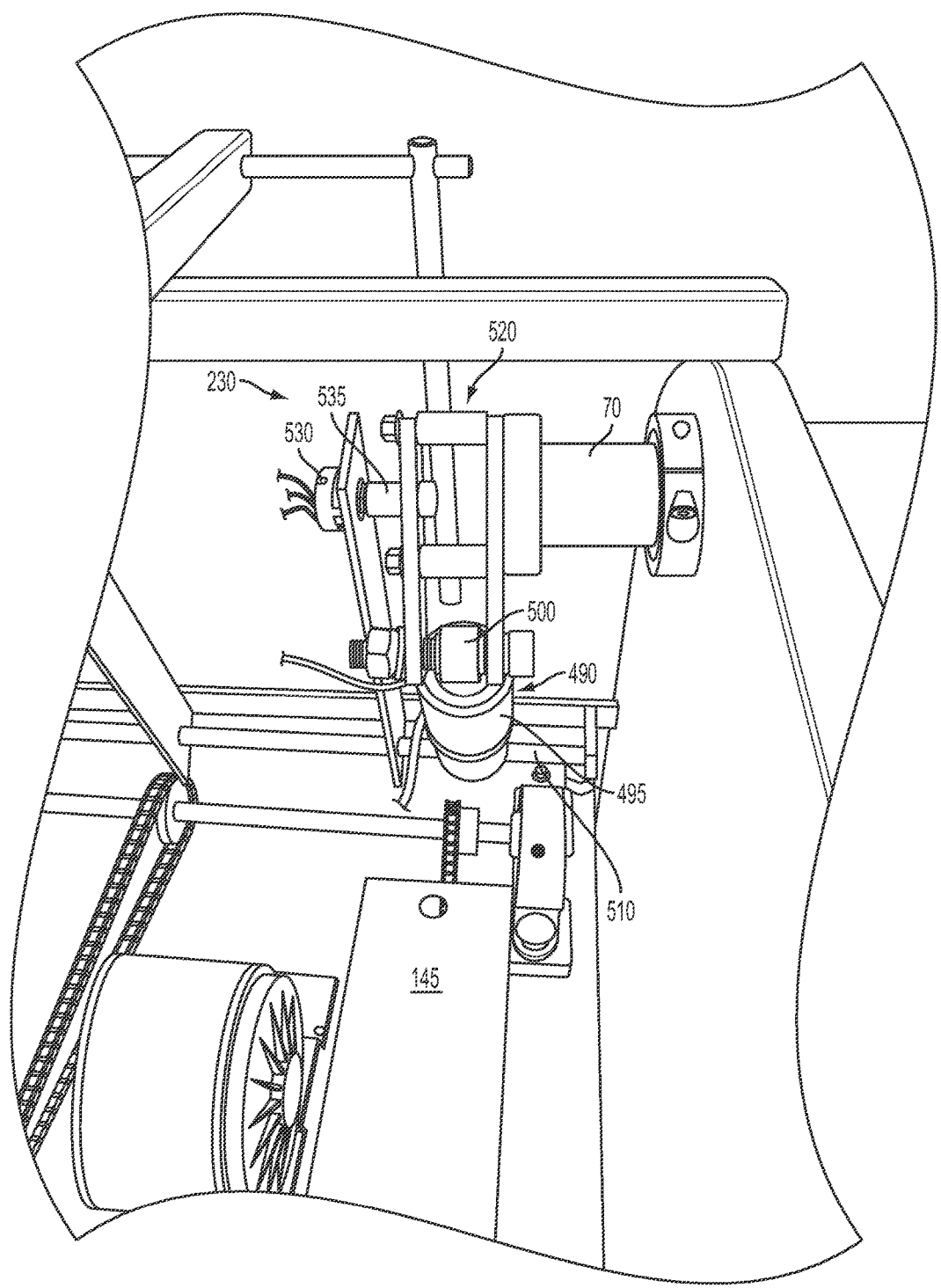
FIGS. 12 and 13 show examples of the resistance members and motion feedback sensors associated with the first and second appendicular members.
Figure 13:
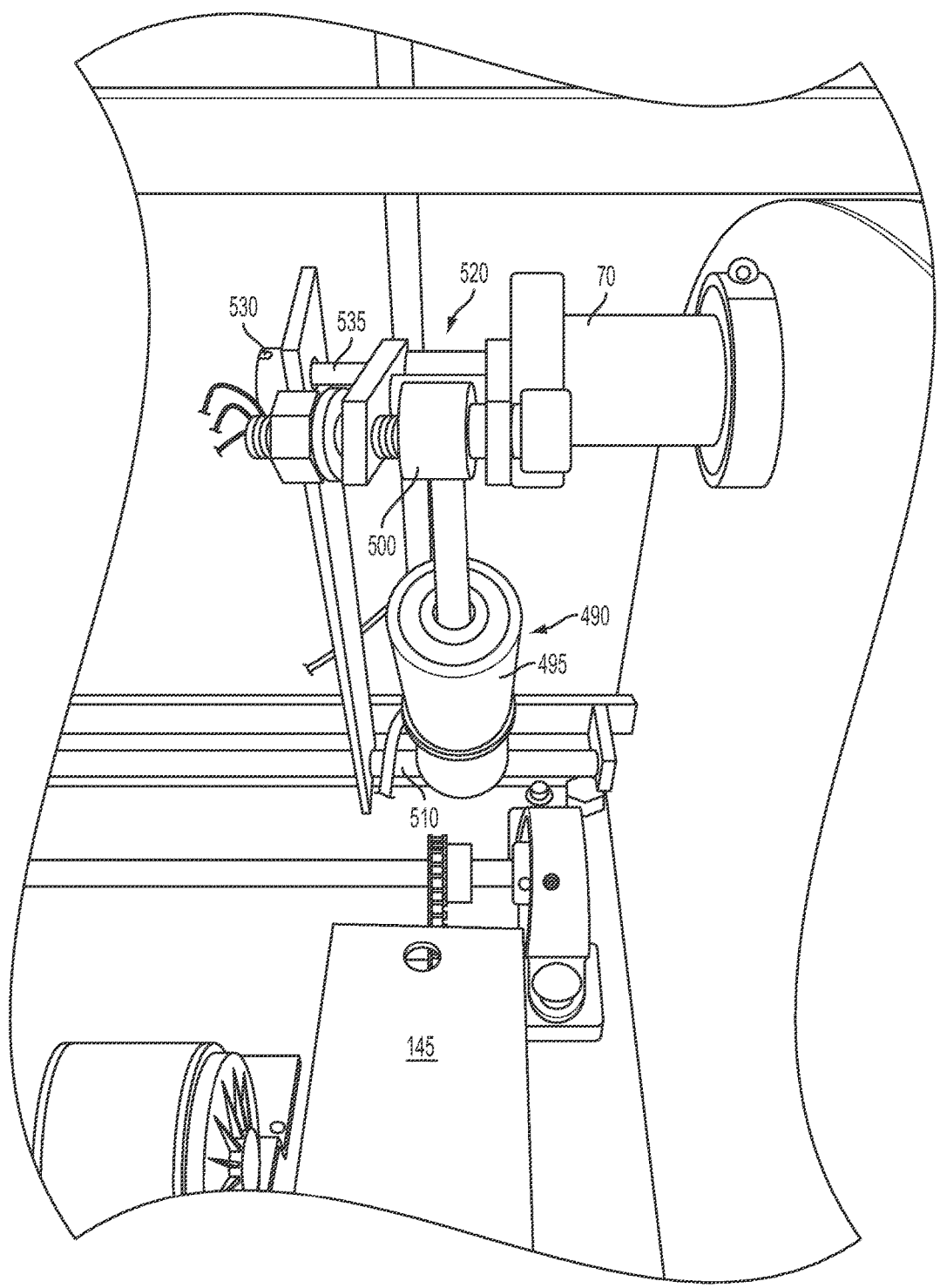

FIGS. 12 and 13 show one manner in which the resistive elements 220 and 230 may be implemented. To reduce repetition, only resistive element 230 is discussed.

In the example shown in FIG. 12, resistive element 230 includes a smart fluid-based actuator 490, which uses a smart-fluid selected from an electro-rheological fluid or a magneto-rheological fluid. The actuator 490 includes a cylinder 495 and a piston 500 disposed within the cylinder 495. A first end of the cylinder 495 is fixed to a cross-rod 510. Opposite the cross-rod 510, the piston 500 engages linkage 520, which extends between the piston 500 and the second appendicular member 70. Rotation of the second appendicular member 70 results in a corresponding linear translation of the piston 500 through the cylinder 495. As such, the actuator 490 controls the resistive force applied to the second appendicular member 70. A rheostat 530 is connected to a rotating shaft 535 of linkage 520 to determine the angular position of the second appendicular member 70. In FIG. 12, the second appendicular member 70 is in the position shown in FIG. 4. In FIG. 13, the second appendicular member 70 is in the position shown in FIG. 3. A similar arrangement may be used to implement resistive element 220 associated with the first appendicular member 50.

Position information for each of the first, second, third, and fourth appendicular members 50, 70, 90, and 110, is detected by at least one sensor. The sensor(s) may be used to feedback the position of the respective appendicular member for use in connection with the workout session controller 270. If the position information is detected over time, the velocity associated with the respective appendicular member may be determined. Further, if the information is determined over time, the acceleration associated with the respective appendicular member may also be determined.

Figure 14:
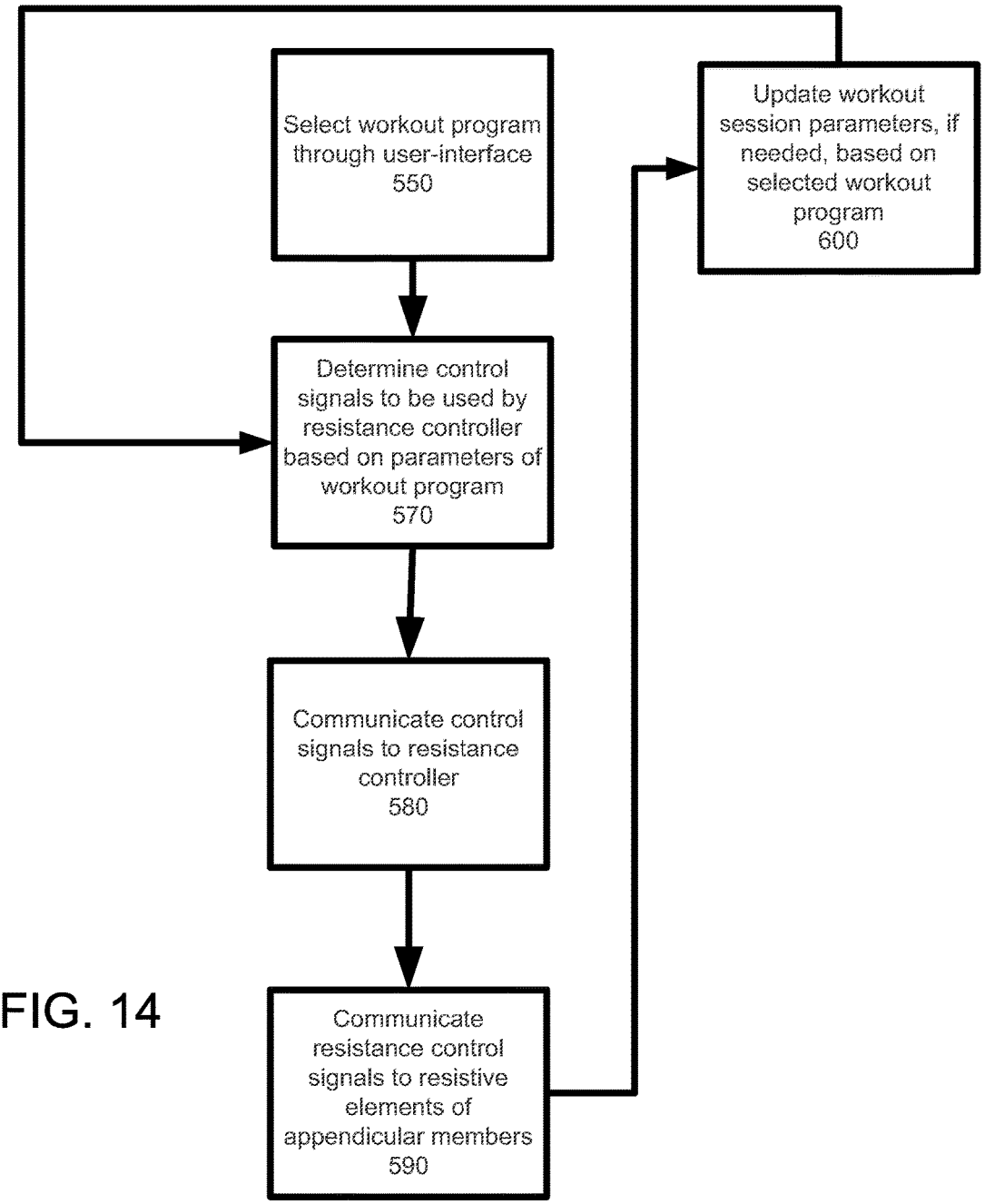
FIG. 14 illustrates operations that may be executed in the example of the system shown in FIG. 10.

FIG. 14 illustrates operations that may be executed by the exemplary system shown in FIG. 10. At operation 550, the user selects a workout program through the user interface, which is then communicated to the workout session controller at operation 560. The control signals to be used by the resistance controller are determined at operation 570 based on parameters of the selected workout program. At operation of 580, the control signals are communicated to the resistance controller, which, in turn, communicates resistance control signals corresponding to the control signals received at operation 580 to signals corresponding to the control signals received from the workout session controller. These control signals are sent to the resistive elements associated with the individual appendicular members at operation 590. The workout session controller updates the session parameters, if needed, based on the selected workout program at operation 600. These updates are provided to, or calculated by, the workout session controller at operation 570.

While the present disclosure has been shown and described with reference to various examples, it will be understood that various changes in form and details may be made without departing from the spirit and scope of the present disclosure as defined by the appended claims.

The invention claimed is:

1. A full-body exercise apparatus comprising:
a frame;
a plurality of appendicular members extending from the frame, wherein the plurality of appendicular members are configured to respectively engage a right arm, a left arm, a right leg, and a left leg of a user, and wherein each of the plurality of appendicular members is movable in a degree of freedom independent of other ones of the plurality of appendicular members; and
a resistive system configured to provide a resistive force on each of the plurality of appendicular members with respect to movement in its respective degree of freedom, wherein the resistive force provided by the resistive system on each of the plurality of appendicular members is adjustable in a generally continuous manner independent of resistive forces on other ones of the plurality of appendicular members thereby allowing concurrent application of different resistive forces to each of the plurality of appendicular members.

2. The full-body exercise apparatus of claim 1, wherein the plurality of appendicular members comprise:
a first appendicular member configured for rotation by a first arm of the user, the first appendicular member having a first respective degree of freedom about a pivot axis; and
a second appendicular member configured for rotation by a second arm of the user, the second appendicular member having a second respective degree of freedom about a further pivot axis.

3. The full-body exercise apparatus of claim 2, wherein the pivot axis and the further pivot axis are generally collinear.

4. The full-body exercise apparatus of claim 2, wherein the plurality of appendicular members comprise:
a third appendicular member configured for movement along a first generally linear axis by a first leg of the user, the third appendicular member having a third respective degree of freedom along the first generally linear axis; and
a fourth appendicular member configured for movement along a second generally linear axis by a second leg of the user, the fourth appendicular member having a fourth degree of freedom along the second generally linear axis.

5. The full-body exercise apparatus of claim 4, wherein the first generally linear axis and the second generally linear axis are substantially parallel with one another.

6. The full-body exercise apparatus of claim 1, wherein the resistive system comprises one or more smart fluid-based actuators respectively associated with one or more of the plurality of appendicular members.

7. The full-body exercise apparatus of claim 6, wherein the one or more smart fluid-based actuators comprise a smart fluid selected from an electro-rheological fluid or a magneto-rheological fluid.

8. The full-body exercise apparatus of claim 1, wherein the resistive system comprises:
a first smart fluid-based actuator respectively associated with a first one of the plurality of appendicular members; and
a second smart fluid-based actuator respectively associated with a second one of the plurality of appendicular members.

9. The full-body exercise apparatus of claim 1, wherein the resistive system comprises:
a regenerative motor responsive to a current to adjust a resistive torque of the regenerative motor;
a first transmission member configured to be driven by a first one of the plurality of appendicular members; and
a second transmission member configured to be driven by a second one of the plurality of appendicular members.

10. The full body exercise apparatus of claim 9, further comprising a single direction clutch disposed for connecting the first and second transmission members.

11. The full-body exercise apparatus of claim 1, further comprising a resistance controller configured to provide control signals to adjust the resistive force provided by the resistive system on each of the plurality of appendicular members.

12. The full-body exercise apparatus of claim 11, wherein the resistance controller comprises a user interface to select a workout program, wherein the control system is configured to adjust the resistive force on each of the plurality of appendicular members using the workout program.

13. A full-body exercise apparatus comprising:
a frame;
first appendicular member extending from the frame and configured to engage a first arm of a user, the first appendicular member being movable about a first pivot axis;
a second appendicular member extending from the frame and configured to engage a second arm of the user, the second appendicular member being movable about a second pivot axis;
a third appendicular member extending from the frame and configured to engage a first leg of the user, the third appendicular member being movable along a first generally linear axis;
a fourth appendicular member extending from the frame and configured to engage a second leg of the user, the fourth appendicular member being movable along a second generally linear axis;
a first resistive element configured to provide a first resistive force on the first appendicular member about the first pivot axis independent of resistive forces applied to the second, third, and fourth appendicular members;
a second resistive element configured to provide a second resistive force on the second appendicular member about the first pivot axis independent of resistive forces applied to the first, third, and fourth appendicular members;
a third resistive element configured to provide a third resistive force on the third appendicular member along the first generally linear axis independent of resistive forces applied to the first, second, and fourth appendicular members; and
a fourth resistive element configured to provide a fourth resistive force on the fourth appendicular member along the second generally linear axis independent of resistive forces applied to the first, second, and third appendicular members.

14. The full-body exercise apparatus of claim 13, wherein the first and second resistive elements comprise one or more smart fluid-based actuators respectively associated with each of the first and second appendicular members.

15. The full-body exercise apparatus of claim 14, wherein the one or more smart fluid-based actuators comprise a smart fluid selected from an electro-rheological fluid or a magneto-rheological fluid.

16. The full-body exercise apparatus of claim 13, further comprising:
   a first smart fluid-based actuator respectively associated with the first appendicular member; and
   a second smart fluid-based actuator respectively associated with the second appendicular member.

17. The full-body exercise apparatus of claim 13, further comprising a control system configured to provide control signals to adjust the resistive forces provided by the first, second, third, and fourth resistive elements.

18. The full-body exercise apparatus of claim 17, wherein the control system comprises a user interface to select a workout program, wherein the control system is configured to adjust the resistive force on each of the first, second, third, and fourth appendicular members using the workout program.

19. A full-body exercise apparatus comprising:
   a frame;
   a plurality of appendicular members extending from the frame, wherein each of the plurality of appendicular members is configured for engagement with a respective limb of a user, and wherein each of the plurality of appendicular members is movable in a degree of freedom independent of other ones of the plurality of appendicular members;
   a resistive system configured to provide a resistive force on each of the plurality of appendicular members with respect to movement in its respective degree of freedom, wherein the resistive force provided by the resistive system on each of the plurality of appendicular members is adjustable in a generally continuous manner independent of resistive forces on other ones of the plurality of appendicular members, wherein the resistive system includes:
      a regenerative motor responsive to a current to adjust a resistive torque of the regenerative motor;
      a first transmission member configured to be driven by a first one of the plurality of appendicular members; and
      a second transmission member configured to be driven by a second one of the plurality of appendicular members.

20. The full body exercise apparatus of claim 19, further comprising a single direction clutch disposed for connecting the first and second transmission members.

* * * * *